United States Patent
Seki et al.

(10) Patent No.: US 9,581,518 B2
(45) Date of Patent: Feb. 28, 2017

(54) PHYSICAL QUANTITY MEASURING DEVICE

(71) Applicant: NAGANO KEIKI CO., LTD., Tokyo (JP)

(72) Inventors: Hidebumi Seki, Tokyo (JP); Hiroyuki Toba, Tokyo (JP); Tomohiro Rokugawa, Tokyo (JP)

(73) Assignee: NAGANO KEIKI CO., LTD., Tokyo (JP)

( * ) Notice: Subject to any disclaimer, the term of this patent is extended or adjusted under 35 U.S.C. 154(b) by 0 days.

(21) Appl. No.: 14/666,558

(22) Filed: Mar. 24, 2015

(65) Prior Publication Data

US 2015/0276535 A1    Oct. 1, 2015

(30) Foreign Application Priority Data

Mar. 26, 2014    (JP) .................................. 2014-063679

(51) Int. Cl.
*G01L 7/00* (2006.01)
*G01L 19/14* (2006.01)

(52) U.S. Cl.
CPC .......... *G01L 19/148* (2013.01); *G01L 19/147* (2013.01)

(58) Field of Classification Search
CPC ..... G01L 19/148; G01L 19/0007; G01L 7/00; G01N 3/12; E21B 21/08; G01F 1/74; G01F 1/00
USPC .......... 73/756, 700, 37, 152.22, 861.42, 861
See application file for complete search history.

(56) References Cited

U.S. PATENT DOCUMENTS

| | | | | |
|---|---|---|---|---|
| 4,732,044 A | * | 3/1988 | Dell'Acqua | G01L 9/0055 338/4 |
| 5,331,857 A | * | 7/1994 | Levine | G01L 9/0052 73/706 |
| 6,298,730 B1 | * | 10/2001 | Yamagishi | G01L 19/0084 73/723 |
| 2006/0042394 A1 | * | 3/2006 | Kosh | G01L 9/0051 73/753 |

FOREIGN PATENT DOCUMENTS

| | | |
|---|---|---|
| DE | 102009045790 A1 | 4/2011 |
| EP | 0922946 A2 | 6/1999 |

(Continued)

OTHER PUBLICATIONS

European Search Report dated Sep. 7, 2015, 9 pages.
(Continued)

*Primary Examiner* — Lisa Caputo
*Assistant Examiner* — Nigel Plumb
(74) *Attorney, Agent, or Firm* — Rankin, Hill & Clark LLP

(57) ABSTRACT

A plate-shaped circuit board configured to receive a detection signal from a detector is housed in a case and is held by a holder with a flat substrate surface thereof intersecting with a bottom surface of a cover member. The holder is attached to the cover member. The cover member includes a cover body, and elongated supporting portions projecting from the bottom surface of the cover body into the case. The supporting portions each include a pair of support projections that support one of opposite side surfaces of the circuit board along a projecting direction of the supporting portions. The holder includes a flat portion provided with engagement pieces engageable with a second substrate.

8 Claims, 15 Drawing Sheets

(56) References Cited

FOREIGN PATENT DOCUMENTS

| | | |
|---|---|---|
| GB | 2180656 A | 4/1987 |
| JP | S49-021152 | 2/1974 |
| JP | 64-13770 | 1/1989 |
| JP | H08-201203 A | 8/1996 |
| JP | 09-138170 | 5/1997 |
| JP | 10-318871 | 12/1998 |
| JP | 11-351994 | 12/1999 |
| JP | 2005-300186 | 10/2005 |
| JP | 2005-353941 | 12/2005 |
| JP | 2007-155505 | 6/2007 |
| JP | 2012-150073 | 8/2012 |
| JP | 2013-205418 | 10/2013 |
| WO | 94/04897 A1 | 3/1994 |
| WO | 2008/078184 | 7/2008 |

OTHER PUBLICATIONS

European Search Report dated Oct. 11, 2016, 7 pages.
Japanese Office Action dated Nov. 8, 2016 (English translation included).

\* cited by examiner

PHYSICAL QUANTITY MEASURING DEVICE

The entire disclosure of Japanese Patent Application No. 2014-063679 filed Mar. 26, 2014 is expressly incorporated by reference herein.

TECHNICAL FIELD

The present invention relates to a physical quantity measuring device for measuring a pressure and/or any other physical quantity of a fluid to be measured.

BACKGROUND ART

In some pressure transmitters and other physical quantity measuring devices, a circuit board receives a detection signal from a detector for detecting a physical quantity, and a signal from the circuit board is outputted to an external device or to a display.

In typical examples of the above physical quantity measuring devices, a circuit board is disposed in parallel with a bottom surface of a holder, and an outer periphery of the circuit board is pressed at regular intervals using a plurality of engagement portions or claws of the holder (Patent Literature 1: JP-A-2005-300186, Patent Literature 2: JP-A-10-318871, Patent Literature 3: JP-A-2007-155505 and Patent Literature 4: JP-A-11-351994).

In other typical examples, a circuit board is disposed perpendicular to a bottom surface of a holder, the circuit board having a first end bonded to a joint-side support body and a second end bonded to a connector-side support body (Patent Literature 5: JP-A-2013-205418 and Patent Literature 6: JP-A-9-138170).

The typical examples of Patent Literatures 1 to 4 require the outer periphery of the circuit board to be held relative to the bottom surface of the holder at an accurate position using the plurality of engagement portions and claws. It is complicated to attach the circuit board at the accurate position.

Further, when the physical quantity measuring device is used in ship or the like, the circuit board may be displaced due to the rolling of the ship or the like, but it is doubtful whether or not necessary measures are taken to deal with a vibration problem in the typical examples.

Specifically, in the typical examples of Patent Literatures 1 to 4, the circuit board, which is pressed using the engagement portions or claws, may be displaced or detached from the engagement portions or claws in response to a vibration applied to the device.

In the typical examples of Patent Literatures 5, 6, both ends of the circuit board each need to be bonded to the holder or the joint, which results in an inefficient device assembly.

Especially in the typical example of Patent Literature 5, the end of the circuit board needs to be machined into a joint shape and bonded to the support body, which also results in an inefficient device assembly.

SUMMARY OF THE INVENTION

An object of the invention is to provide an easy assembling physical quantity measuring device capable of reliably holding a circuit board relative to a cover member.

According to an aspect of the invention, a physical quantity measuring device includes: a cylindrical case having a first open end and a second open end; a cover member attached to the first open end of the case, the cover member having a bottom surface; a detector provided to the second open end of the case to detect a physical quantity; a plate-shaped circuit board configured to receive a detection signal from the detector; and a holder attached to the cover member to hold the circuit board in a manner that a flat surface of the circuit board intersects with the bottom surface, the holder including an engagement piece engageable with the circuit board, the cover member including: a cover body defining the bottom surface; and a supporting portion projecting from the bottom surface into the case, the supporting portion including a pair of support projections configured to support opposite side surfaces of the circuit board along a projecting direction of the supporting portion.

In the above aspect, the side surfaces of the circuit board on both lateral sides are supported by the support projections of the cover member, and then the engagement piece is engaged with the circuit board. In the above state, the cover member, the holder and the circuit board are untied. While the circuit board is present in the case provided with the detector, the case and the cover member are bonded to each other.

With the above arrangement, the two surfaces of the circuit board (i.e., the side surfaces on both lateral sides) are supported by the supporting portion in the above aspect, while the circuit board is supported relative to the bottom surface of the cover member by the holder, so that it is unnecessary to bond the circuit board to a detector-side member. An assembly process of the physical quantity measuring device can thus be simplified. Further, since the side surfaces of the circuit board on both lateral sides are supported by the support projections, the circuit board can be accurately positioned to the bottom surface. Further, since the holder is directly attached to the cover member or indirectly attached to the cover member via an intervening member, and the circuit board is engaged with the holder using the engagement piece, the circuit board can be reliably held relative to the cover member without being displaced relative to the cover member irrespective of the rolling of the physical quantity measuring device.

In the above aspect, it is preferable that the supporting portion further include a claw provided to each of the support projections to prevent the circuit board from being detached from the bottom surface, and the holder further include a flat portion facing the bottom surface, the flat portion being provided with the engagement piece.

With the above arrangement, the side surfaces of the circuit board on both lateral sides are supported by the support projections of the cover body, and then the flat portion of the holder is inserted into a space between the circuit board and the bottom surface of the cover body to bring the engagement piece into engagement with the circuit board. Further, the claw serves to prevent the circuit board from falling off the support projections, so that displacement of the circuit board relative to the cover member is restrained and thus the circuit board is further reliably held relative to the cover member.

In the above aspect, it is preferable that the holder be held between the cover body and the case.

With the above arrangement, the holder can be easily and reliably attached to the cover member merely by inserting the holder between the cover body and the case.

In the above aspect, it is preferable that the case be crimped to fasten the cover body and the holder to each other.

With the above arrangement, the circuit board is stably supported relative to the cover member. Further, the assembly process can be simplified.

In the above aspect, it is preferable that the case and the holder be each made of a metal and the cover member be a made of a synthetic resin.

With the above arrangement, the holder and the case are in contact with each other, so that the circuit board can be easily grounded.

In the above aspect, it is preferable that the engagement piece include an engagement claw engageable with an engagement hole provided to the flat surface of the circuit board.

With the above arrangement, the engagement claw is engaged with the engagement hole of the circuit board, thereby preventing displacement of the circuit board in an in-plane direction of the flat surface of the circuit board.

In the above aspect, it is preferable that the engagement hole be provided adjacent to the bottom surface of the circuit board.

With the above arrangement, the engagement piece can be shortened, thereby reducing, for instance, breakage of the engagement piece. Alternatively, the engagement hole may be provided at a position remote from the bottom surface of the circuit board.

In this case, however, the engagement piece needs to be elongated and thus may be damaged, for instance, in attaching the circuit board.

In the above aspect, it is preferable that the flat surface of the circuit board include two flat surfaces intersecting with the side surfaces of the circuit board, the pair of support projections have mutually opposed surfaces functioning as a pair of first support surfaces facing peripheries of the flat surfaces of the circuit board, the pair of first support surfaces have edges connected by a second support surface facing one of the side surfaces of the circuit board, and the pair of first support surfaces and the second support surface define a support groove for supporting the circuit board.

With the above arrangement, the U-shaped support groove defined by the two first support surfaces and the second support surface serves to reliably support the circuit board.

BRIEF DESCRIPTION OF DRAWING(S)

Figure 4:
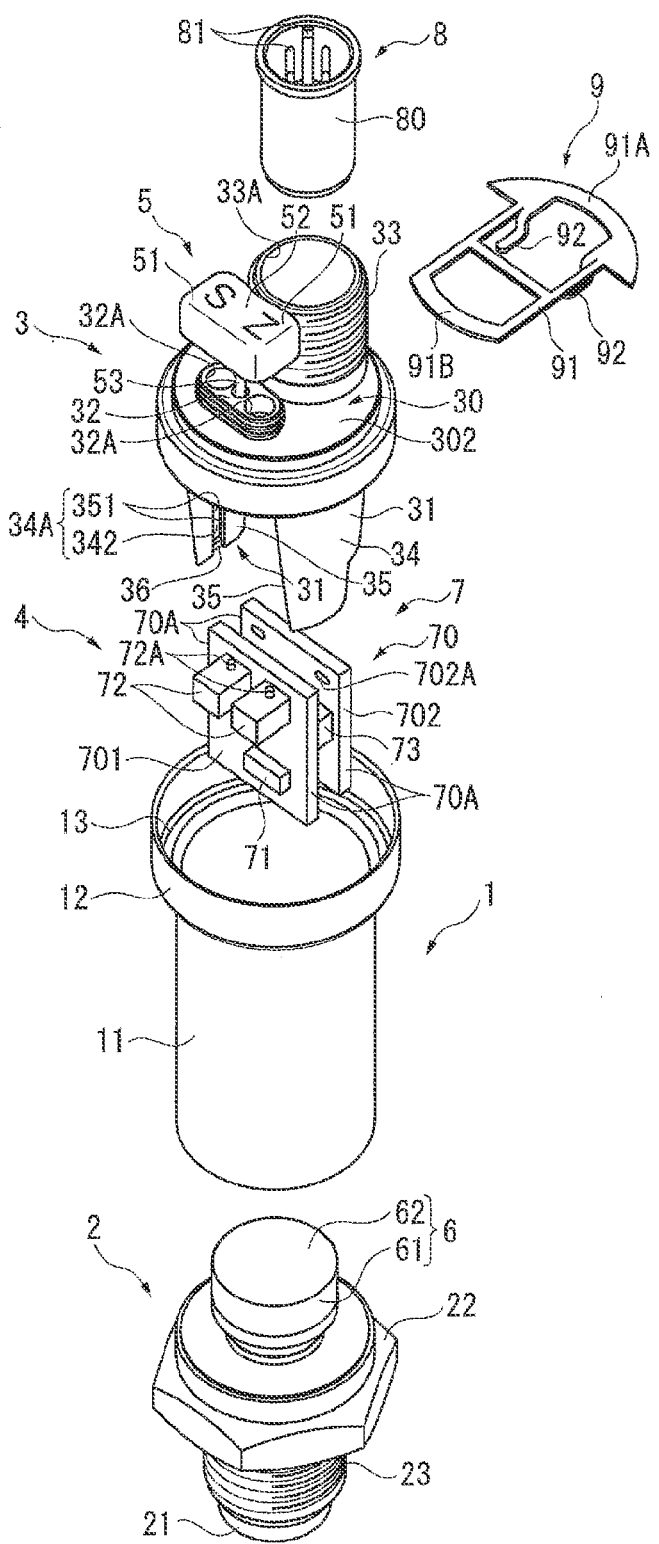
FIG. 4 is an exploded perspective view showing the physical quantity measuring device.
Figure 13:
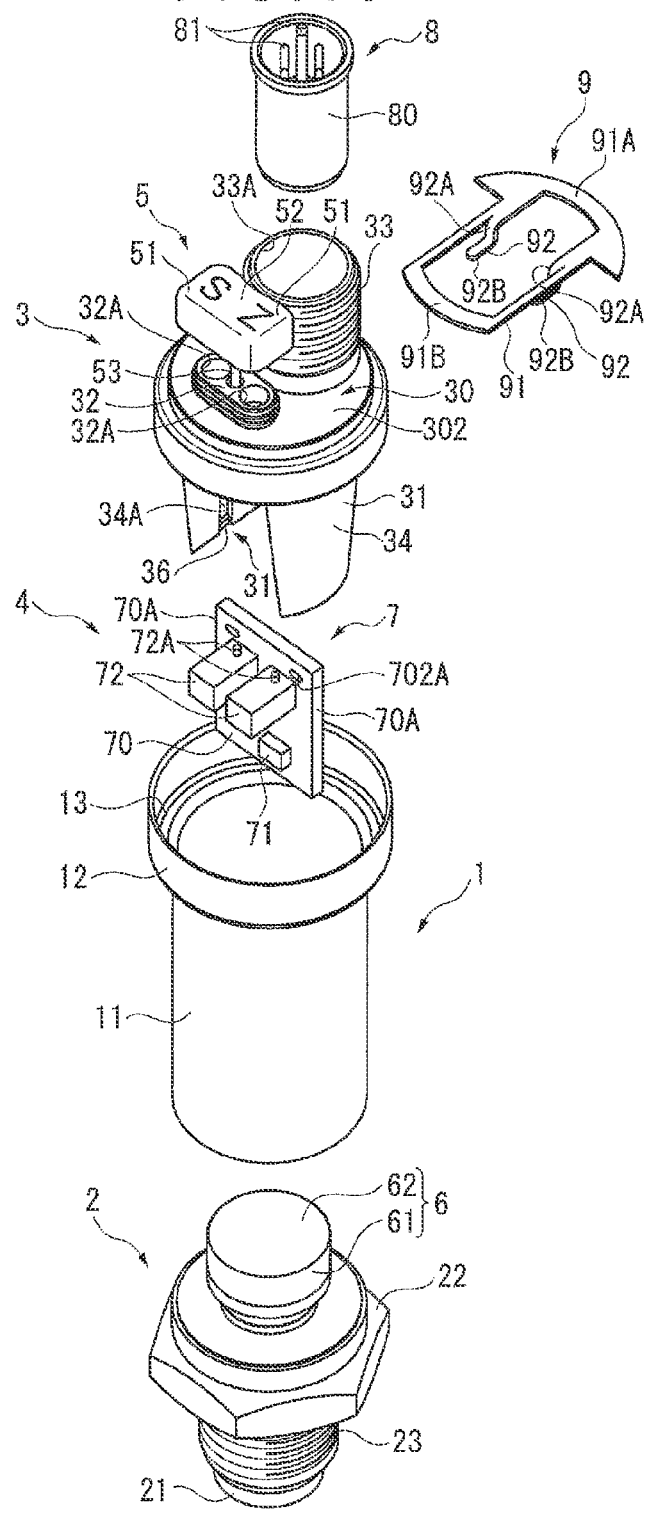

FIG. 13, which corresponds to FIG. 4, shows a modification of the exemplary embodiment.

Figure 5:
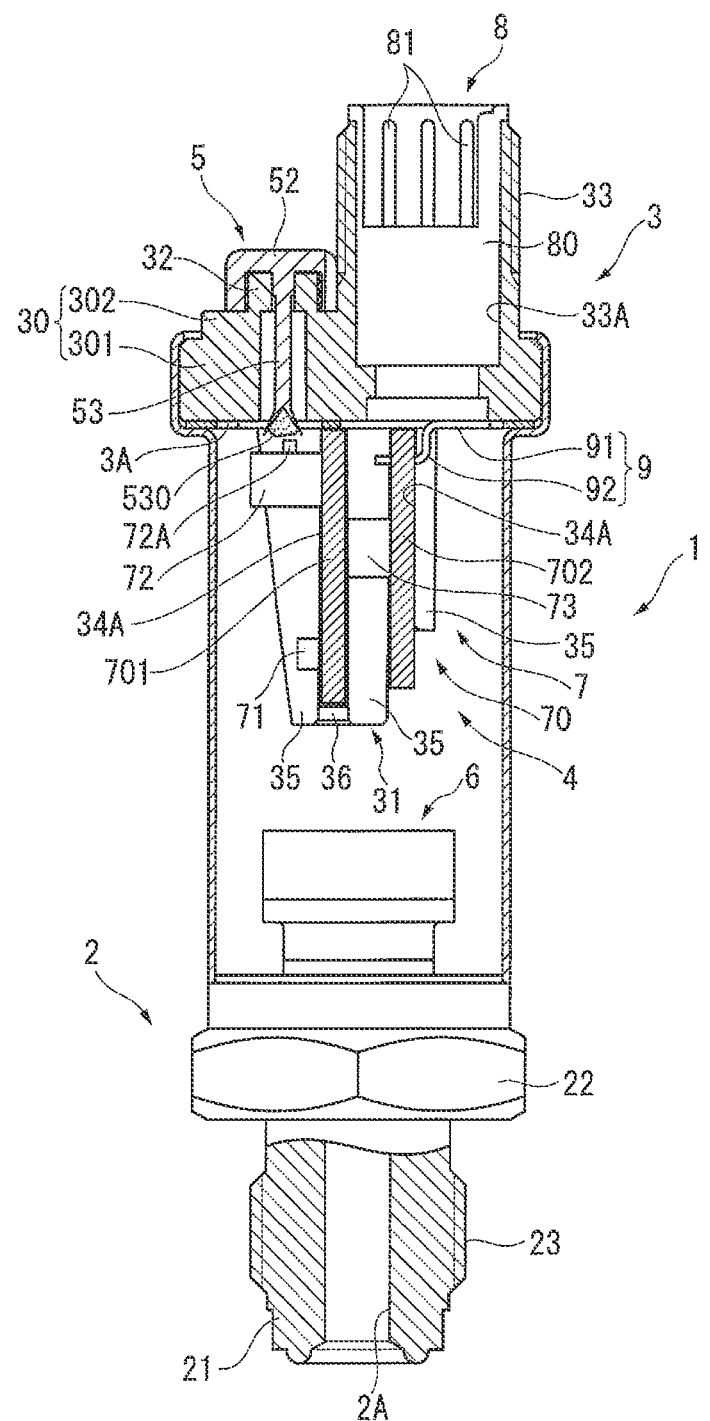
FIG. 5 is a sectional view showing the physical quantity measuring device.
Figure 14:
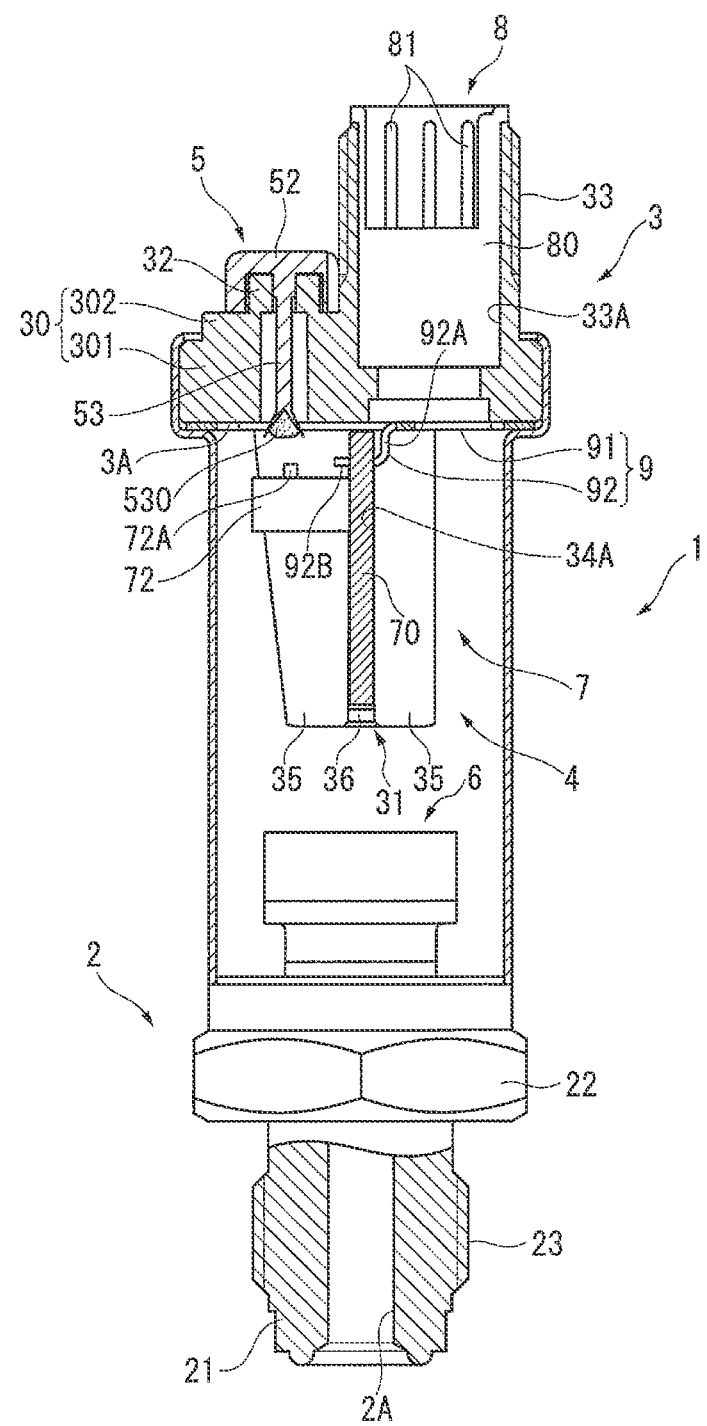

FIG. 14, which corresponds to FIG. 5, shows the modification of the exemplary embodiment.

Figure 8:
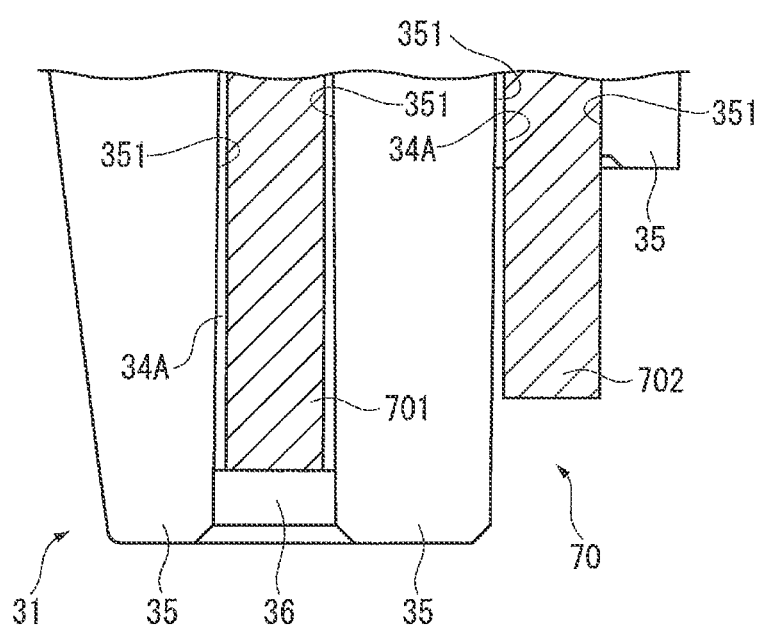
FIG. 8 is a side view showing a supporting portion.
Figure 15:
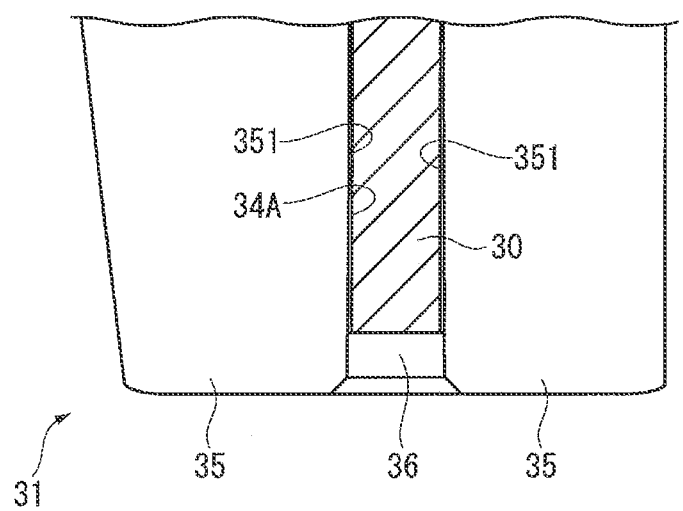

FIG. 15, which corresponds to FIG. 8, shows the modification of the exemplary embodiment.

DESCRIPTION OF EMBODIMENT(S)

An exemplary embodiment of the invention will be described with reference to the attached drawings.

FIGS. 1 to 5 show an overall arrangement of a physical quantity measuring device according to the exemplary embodiment. The physical quantity measuring device according to the exemplary embodiment is used, for instance, in a ship or the like.

Figure 1:
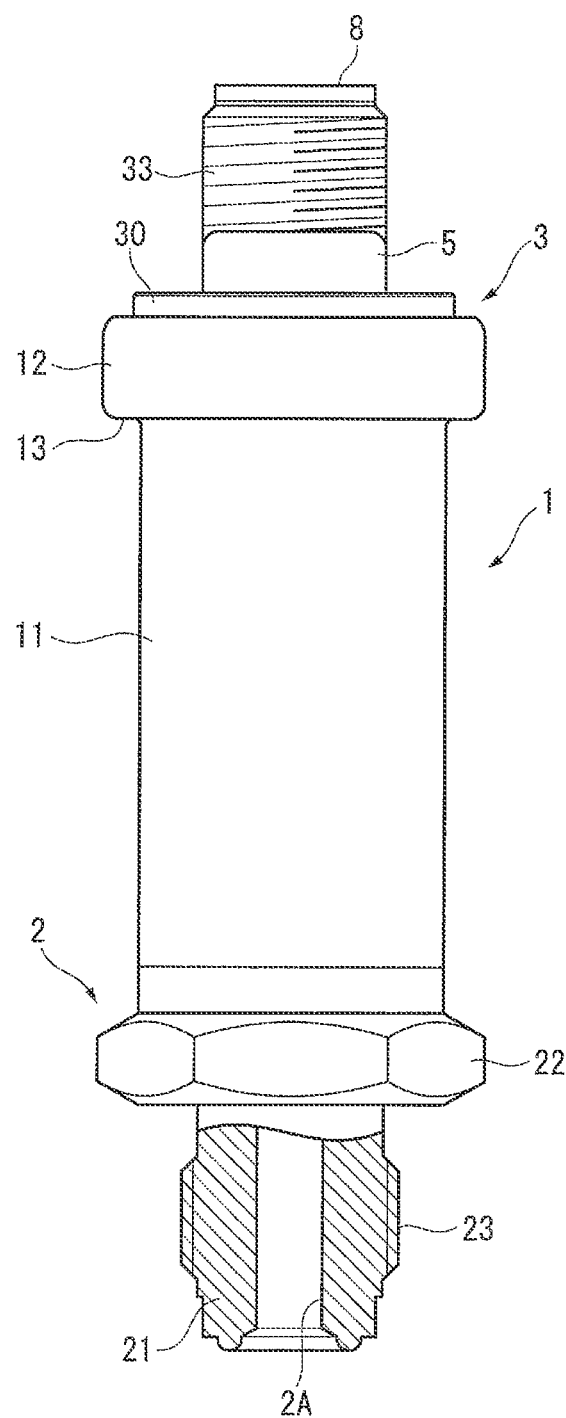
FIG. 1 is a partially broken side elevational view showing a physical quantity measuring device according to an exemplary embodiment of the invention.
Figure 2:
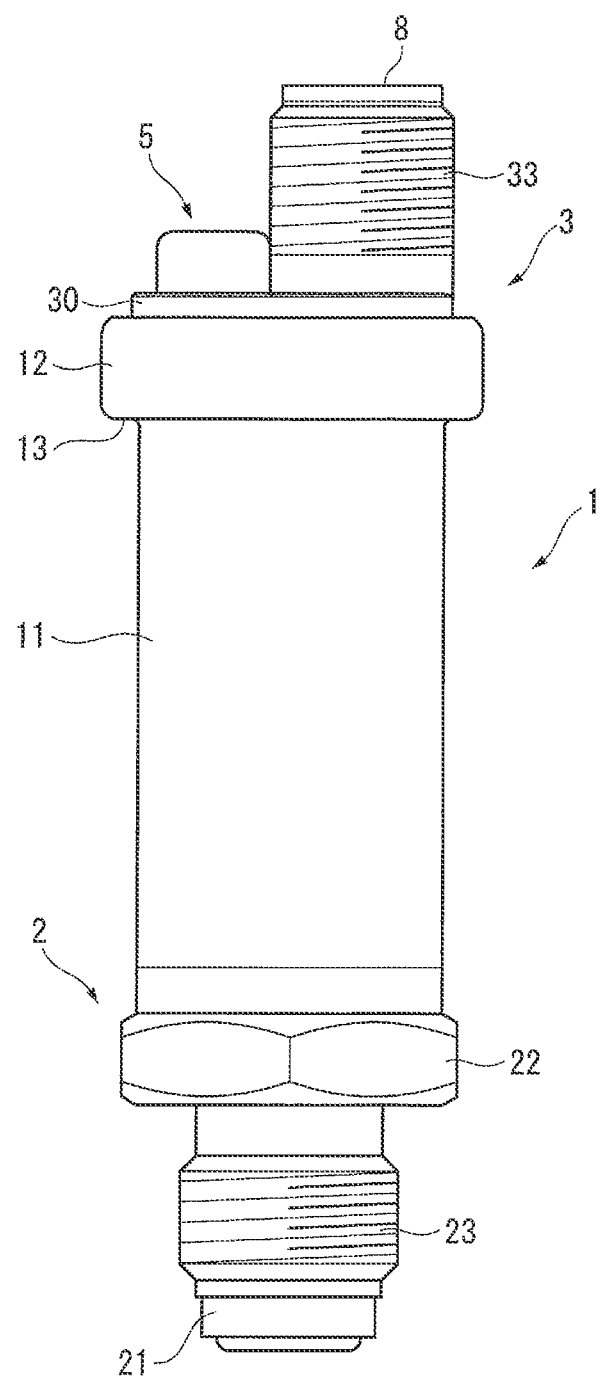
FIG. 2 is another side elevational view showing the physical quantity measuring device as seen in a direction different from that of FIG. 1.
Figure 3:
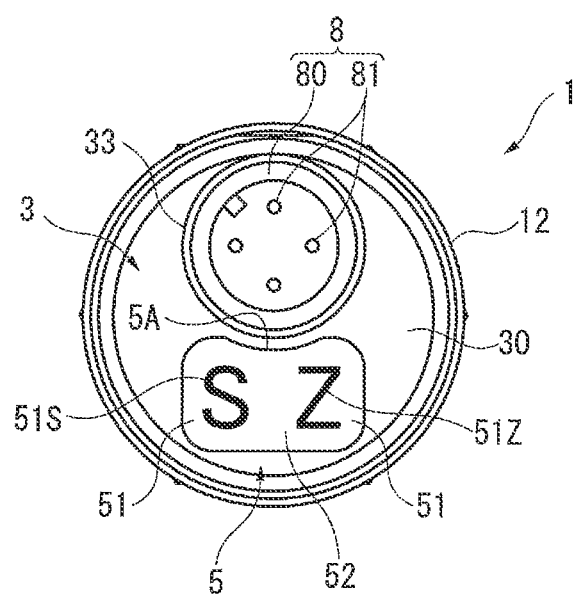
FIG. 3 is a plan view showing the physical quantity measuring device.

FIGS. 1 and 2 show an exterior of the physical quantity measuring device. FIG. 3 is a plan view of the physical quantity measuring device. FIG. 4 schematically shows an arrangement of the physical quantity measuring device. FIG. 5 is a sectional view of the physical quantity measuring device.

As shown in FIGS. 1 to 5, the physical quantity measuring device includes: a cylindrical case 1; a joint 2 provided to a first open end of the case 1; a cover member 3 provided to a second open end of the case 1; a measuring mechanism 4 provided inside the case 1; and a cap member 5 removably attachable to the cover member 3.

The case 1, which is machined from a metal cylindrical member, includes a body 11 and a fitting ring 12 integrally provided to a side of the body 11 corresponding to the second open end of the case 1, the fitting ring 12 being fitted on the cover member 3.

The fitting ring 12 has a diameter larger than that of the body 11. A stepped portion 13 is defined between the body 11 and the fitting ring 12 along a case-diameter direction.

The joint 2 is a metal member including: a shaft 21 provided with an introduction hole 2A through which a fluid to be measured is introduced; and a flange 22 radially extending from the center of the shaft 21.

The shaft 21 has a first end provided with a thread 23 to be screwed into a mount (not shown).

As shown in FIGS. 4 and 5, the measuring mechanism 4 includes: a detector 6 provided to a second end of the shaft 21 of the joint 2 to detect a pressure of the fluid to be measured; a circuit board 7 disposed at a distance from the detector 6; a signal transmitting member 8 connected to the circuit board 7; and a holder 9 attached to the cover member 3 to hold the circuit board 7.

The detector 6 is a metal member including: a cylindrical portion 61 bonded to the second end of the shaft 21; and a diaphragm 62 integrally provided to an end of the cylindrical portion 61 opposite with the second end of the shaft 21.

The diaphragm 62 includes a strain gauge (not shown) for detecting the pressure of the fluid to be measured introduced through the introduction hole 2A.

The circuit board 7 includes: a substrate body 70; and an electronic circuit unit 71 and an electronic adjusting unit 72 that are provided on the substrate body 70.

The substrate body 70 is a rectangular plate member in a plan view and has a front surface on which a wiring pattern (not shown) is formed.

In the exemplary embodiment, the substrate body 70 includes: parallel first substrate 701 and second substrate 702; and a connecting body 73 that connects the first substrate 701 and the second substrate 702.

The electronic circuit unit 71, which receives a detection signal from the detector 6, is disposed on the front surface of the substrate body 70. It should be noted that rear one of the substrates of the substrate body 70 is similarly provided with an electronic circuit unit (not shown). The strain gauge of the detector 6 and the electronic circuit unit 71 are electrically connected to each other through a wiring or the like (not shown).

The electronic adjusting unit 72, which adjusts the electronic circuit unit 71, includes two electronic adjusting units disposed on the front surface of the substrate body 70. In the exemplary embodiment, the left one of the electronic adjusting units 72 shown in FIG. 4 is intended for span adjustment (adjustment of output voltage) and the right one of the electronic adjusting units 72 shown in FIG. 4 is intended for zero adjustment.

The electronic adjusting units 72 are each provided with an operable portion 72A functioning as a trimmer near the cover member 3. The operable portion 72A is turned or pressed with a tool such as driver (not shown) to perform the adjustment.

The signal transmitting member 8 includes a cylindrical member 80 and a plurality of terminals 81 provided to the cylindrical member 80. The terminals 81 are electrically connected to the circuit board 7 through a wiring or the like (not shown).

As shown in FIGS. 4 and 5, the cover member 3, which is made of a synthetic resin, includes a cover body 30, a supporting portion 31 provided to the cover body 30 and projecting toward the inside of the case 1; and a step 32 and a cylindrical portion 33 provided to the cover body 30 at a side opposite with the supporting portion 31.

The cover body 30 includes: a large-diameter portion 301 having a bottom surface 3A facing the inside of the case 1; and a small-diameter portion 302 integral with a surface of the large-diameter portion 301 opposite with the bottom surface 3A.

The supporting portion 31 is an elongated member projecting from the bottom surface 3A of the large-diameter portion 301 toward the inside of the case 1. It should be noted that the bottom surface 3A of the cover body 30 may be provided with a guide groove G so that the holder 9 can be attached to the cover body 30 without interference of the wiring or the like (not shown) connected to the terminals 81 (see imaginary lines in FIGS. 6 and 7).

The step 32 projects from an outer surface of the cover body 30 opposite with the bottom surface 3A. The step 32 is in an oblong shape in a plan view and has operation holes 32A arranged side by side (on right and left sides as shown in FIG. 4).

The left one of the operation holes 32A is provided so that the operable portion 72A of the electronic adjusting unit 72 for span adjustment can be operated with a tool such as a driver (not shown). The right one of the operation holes 32A is provided so that the operable portion 72A of the electronic adjusting unit 72 for zero adjustment can be operated with a tool such as a driver (not shown).

The operable portions 72A are disposed right under the operation holes 32A so that the operable portions 72A can be easily operated with a tool such as a driver.

The cylindrical portion 33 is provided adjacent to the step 32 and has an inner circumferential surface defining a mount hole 33A in which the cylindrical member 80 is to be mounted. The cylindrical portion 33 has an outer circumferential surface provided with a male thread.

With reference to FIGS. 6 to 9, description will be made on an arrangement for the circuit board 7 to be supported on the cover member 3.

Figure 6:
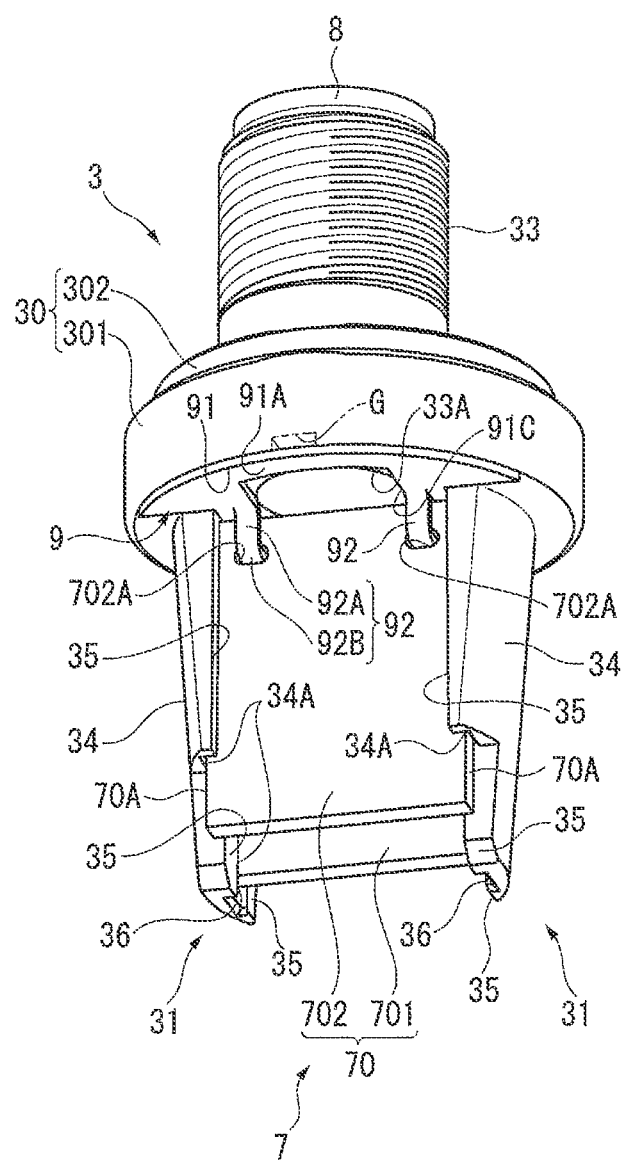
FIG. 6 is a perspective view showing a circuit board supported by a cover member.
Figure 7:
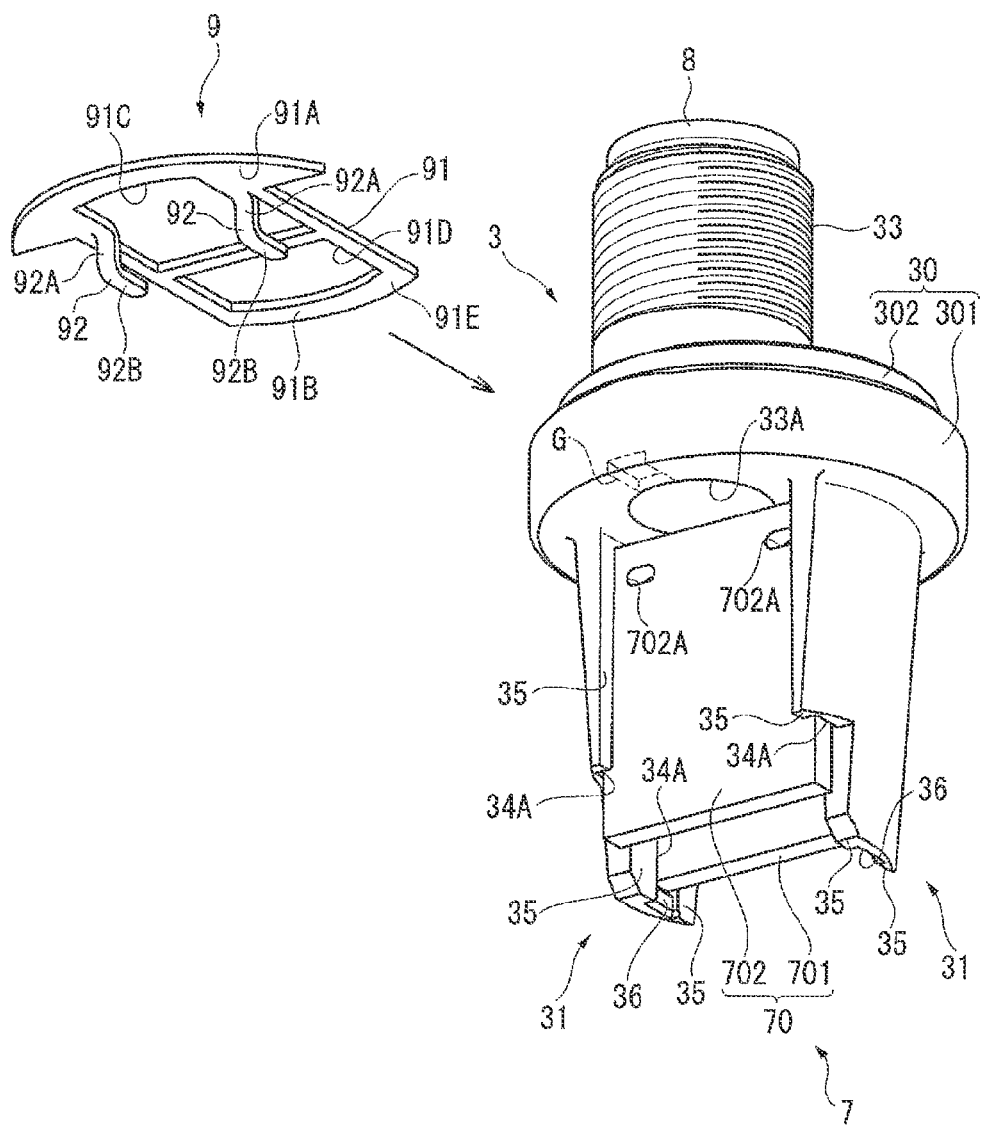
FIG. 7 is a perspective view showing a holder to be attached to the cover member.

FIG. 6 shows an overall arrangement for the circuit board 7 to be supported on the cover member 3. FIG. 7 shows the holder 9 to be attached to the cover member 3. FIG. 8 shows a relevant part of the supporting portion 31.

As shown in FIGS. 4 to 7, the supporting portion 31 includes supporting portions disposed at two opposite positions on an outer periphery of the bottom surface 3A of the large-diameter portion 301.

The supporting portions 31 each include a base 34 and pair(s) of support projections 35 provided to an inner surface of the base 34. The respective inner surfaces of the supporting portions 31 are opposed to each other in parallel.

The support projections 35, which are configured to support the first substrate 701 and the second substrate 702, include three support projections extending along a longitudinal direction of the base 34 (a projecting direction of the supporting portions). Specifically, the support projections 35 include a center support projection disposed at the center of the base 34, a first side support projection disposed at a first edge of the base 34 and a second side support projection disposed at a second edge of the base 34 opposite with the first edge, the center support projection and the first side support projection being paired to support the first substrate 701, the center support projection and the second side support projection being paired to support the second substrate 702.

A surface of the center support projection 35 and a surface of the first side support projection 35 (i.e., a pair of first support surfaces 351) respectively face peripheries of two opposite flat surfaces of the first substrate 701, the first support surfaces 351 having edges connected by an inner surface of the base 34 (i.e., a second support surface 342) that faces a side surface 70A of the first substrate 701.

Similarly, a surface of the center support projection 35 and a surface of the second side support projection 35 (i.e., another pair of first support surfaces 351) respectively face peripheries of two opposite flat surfaces of the second substrate 702, the first support surfaces 351 having edges connected by an inner surface of the base 34 (another second support surface 342) that faces a side surface 70A of the second substrate 702.

In the exemplary embodiment, the pair of first support surfaces 351 and the second support surface 342 in combination define a support groove 34A that supports the first substrate 701.

A claw 36 is provided between the center support projection 35 and the first side support projection 35 to prevent detachment of the first substrate 701. It should be noted that although it seems that only one of the pairs of supporting portions 31 is provided with the claw 36 in the figures, the other supporting portion 31 is also provided with another claw 36 having the same structure.

The claw 36 is provided to a distal end of the base 34 in a projecting manner.

It should be noted that a line connecting the respective centers of the opposite supporting portions 31 coplanar with the bottom surface 3A is offset from an imaginary line passing through the circle center of the bottom surface 3A. Further, an outer surface of the base 34 is in an arc along an inner circumferential surface of the case 1, and is provided with a slope so that the base 34 is tapered from the bottom surface 3A toward the distal end thereof. The second side support projection 35 for supporting the second substrate 702 is thus longitudinally shorter than the first support projection 35 for supporting the first substrate 701, so that an end of the second substrate 702 is exposed. Therefore, the claw 36 is not provided between the center support projection 35 and the second side support projection 35. It should be noted that the slope provided to the outer surface of the base 34 to taper the base 34 from the bottom surface 3A toward the distal end thereof is necessary in molding each of the supporting portions 31 from a synthetic resin and, further, contributes to easy insertion of the cover body 30 into the case 1.

Figure 9:
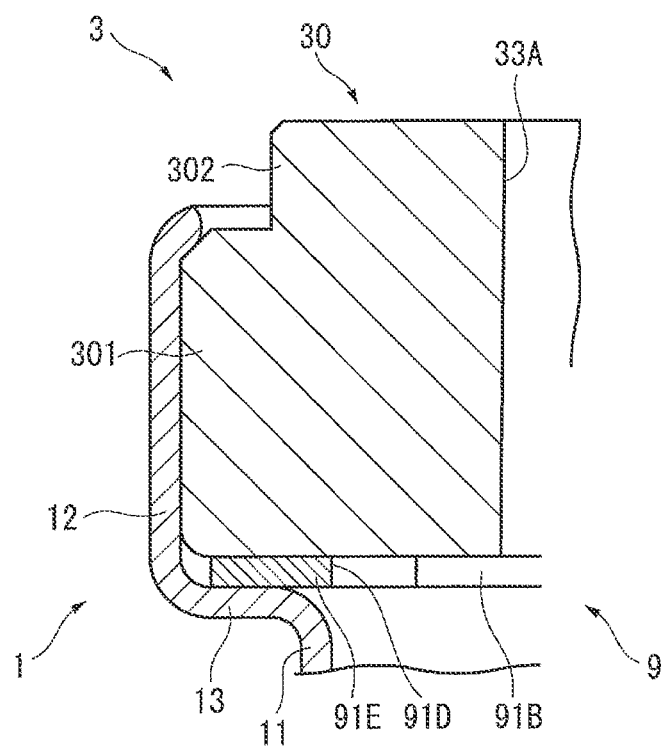
FIG. 9 is a sectional view showing the holder attached to the cover member.

The holder 9 will be described with reference to FIGS. 4 to 7 and 9. FIG. 9 shows the holder 9 attached to the cover member 3.

As shown in FIGS. 4 to 7 and 9, the holder 9 is a metal member for holding the circuit board 7 with a flat surface of the circuit board 7 being perpendicular to the bottom surface 3A.

The holder 9 includes a flat portion 91 facing the bottom surface 3A of the cover member 3 and an engagement piece 92 provided to the flat portion 91 to be engaged with the second substrate 702.

The flat portion 91 includes a first plate 91A and a second plate 91B integrally provided to the first plate 91A.

The first plate 91A, which is to be held between the stepped portion 13 of the case 1 and the bottom surface 3A of the cover member 3, has an outline in conformity with an inner circumferential surface of the fitting ring 12.

The first plate 91A has an arc outer surface and a linear portion opposite with the outer surface, the linear portion being brought into contact with side surfaces of the supporting portions 31. When the first plate 91A is brought into contact with the side surfaces of the supporting portions 31, the holder 9 is positioned relative to the cover member 3 (see FIGS. 6 and 7).

The second plate 91B is inserted between the bottom surface 3A of the cover member 3 and the first substrate 701 and the second substrate 702 at a position between the pair of supporting portions 31 (see FIG. 7).

The second plate 91B includes two windows 91C, 91D and an arc end 91E opposite with the first plate 91A.

The window 91C serves as a space for inserting the wiring or the like for electrically connecting the terminals 81 and the circuit board 7. The window 91D serves as a space for preventing the holder 9 from interfering with a tool such as a driver inserted through one of the operation holes 32A to operate the operable portion 72A.

As shown in FIG. 9, the end 91E of the second plate 91B, which is to be held between the stepped portion 13 of the case 1 and the bottom surface 3A of the cover member 3, has an outline in conformity with the inner circumferential surface of the fitting ring 12.

The fitting ring 12 of the case 1 is crimped to fasten the cover body 30 and the flat portion 91 of the holder 9 to each other. In the exemplary embodiment, the fitting ring 12 is continuously crimped along the entire circumference thereof (i.e., full-circumference crimping), but may alternatively be crimped at predetermined spots (i.e., spot crimping). It should be noted that the respective outlines of the first plate 91A and the end 91E of the second plate 91B may be, for instance, in a trapezoidal shape instead of being in an arc as long as the first plate 91A and the end 91E of the second plate 91B are held between the stepped portion 13 of the case 1 and the bottom surface 3A of the cover member 3.

As shown in FIGS. 4 to 7, the engagement piece 92 includes a rising piece 92A integral with the first plate 91A and an engagement claw 92B integral with the rising piece 92A and engageable with an engagement hole 702A provided to the second substrate 702. The engagement hole 702A and the engagement claw 92B are fixed by soldering (not shown).

In the exemplary embodiment, the engagement hole 702A includes two right and left engagement holes provided to the second substrate 702 at positions near the bottom surface 3A of the cover member 3 (an upper end in FIGS. 5 and 6). The engagement piece 92 also includes two engagement pieces (two rising pieces 92A) in accordance with the number of the engagement holes 702A.

Figure 10:
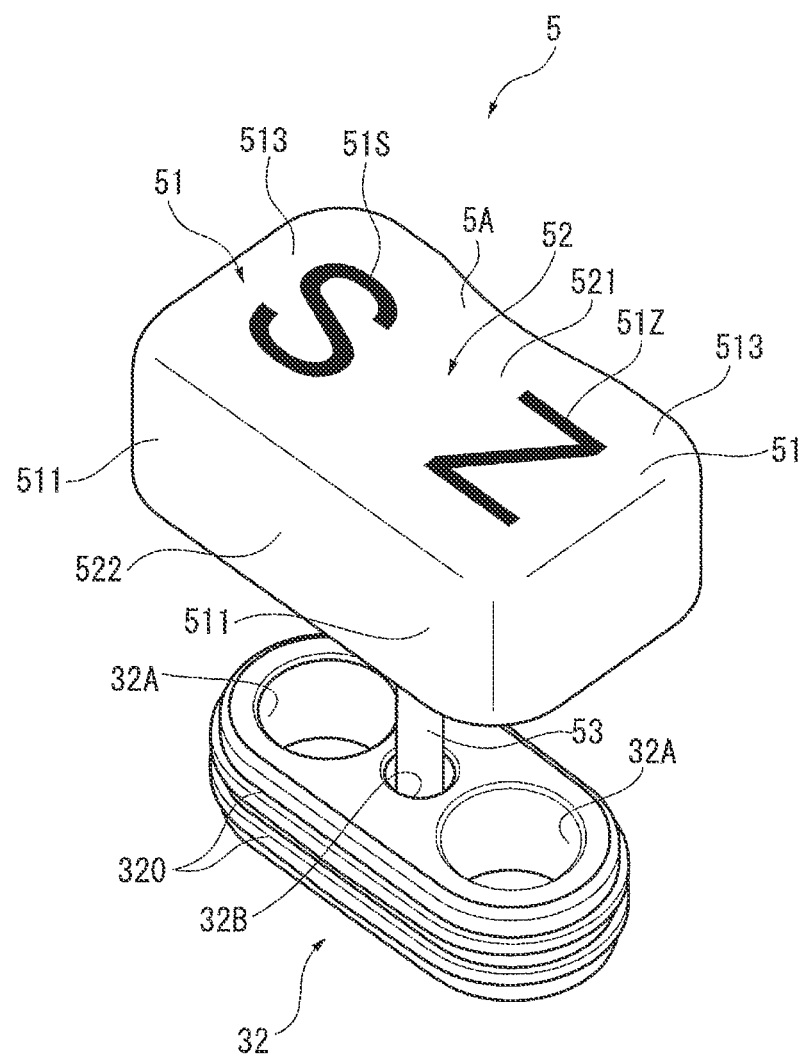
FIG. 10 is a perspective view showing a cap member.
Figure 11:
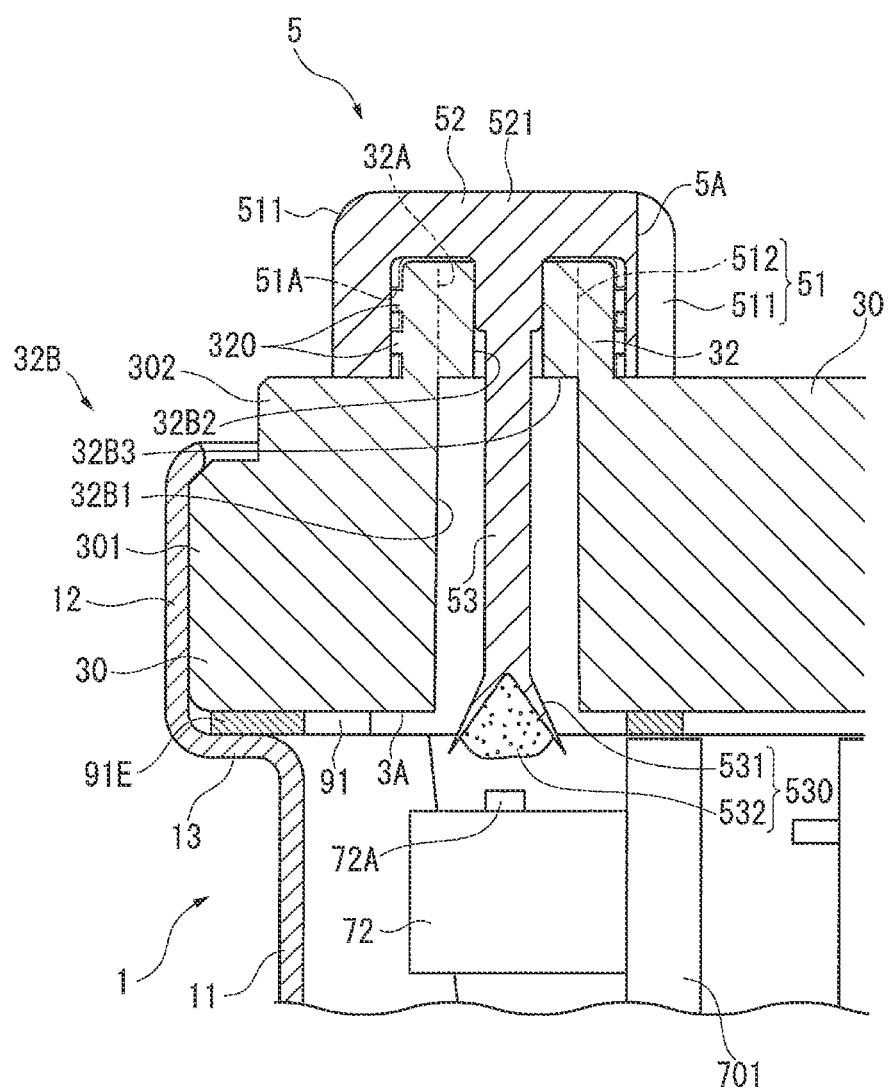
FIG. 11 is a sectional view showing the cap member.
Figure 12:
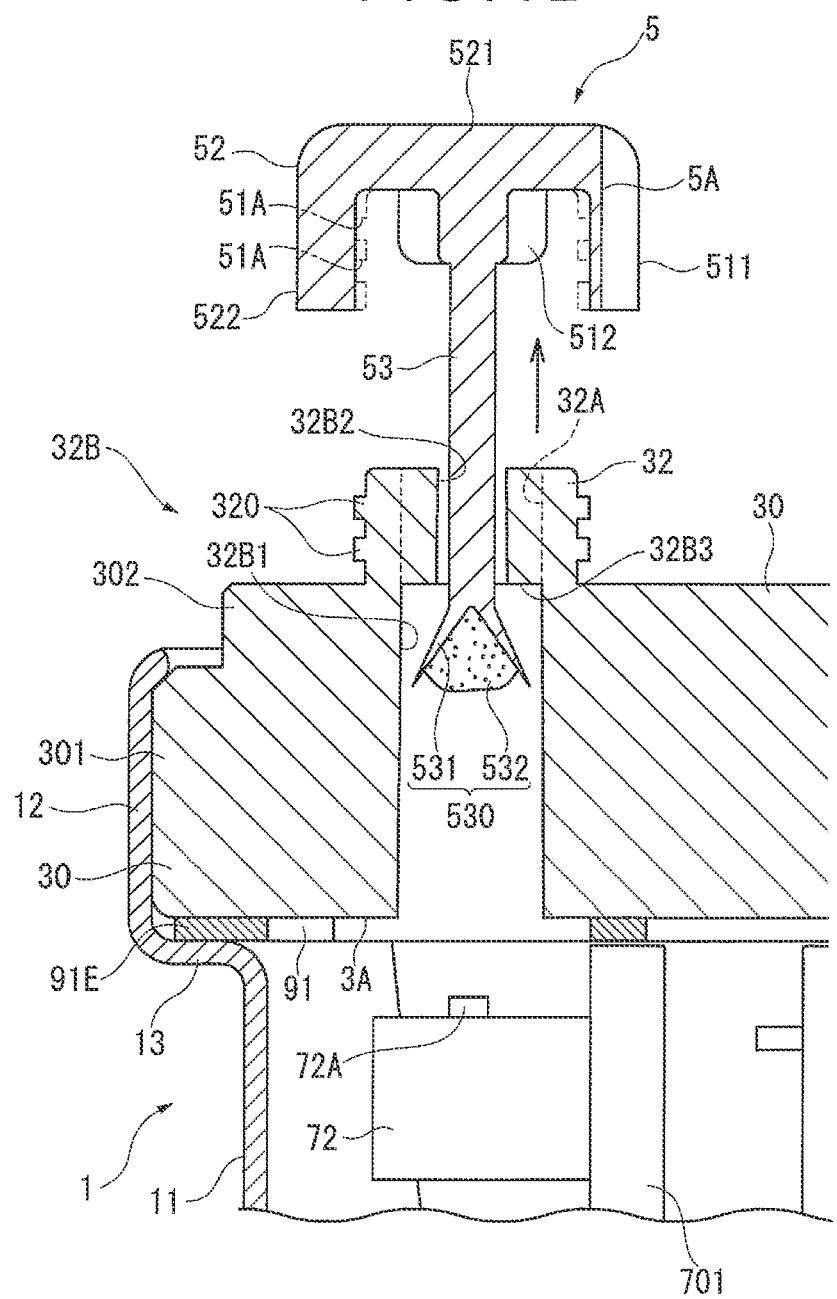
FIG. 12 is a sectional view showing the cap member to be removed.

An arrangement of the cap member 5 will be described with reference to FIGS. 3 to 5 and 10 to 12. FIGS. 10 to 12 show a detailed arrangement of the cap member 5.

As shown in FIGS. 3 to 5 and 10 to 12, the cap member 5 includes: two cap bodies 51 removably attachable to the two operation holes 32A provided to the step 32; and a uniting portion 52 uniting the cap bodies 51 to each other. The uniting portion 52 is connected to a first end of an elastic linear loss-preventing member 53 made of a synthetic resin. A second end of the linear loss-preventing member 53 is engageable with the cover body 30.

The cap member 5 has an outer wall that faces the cylindrical portion 33. The outer wall is provided with a recess SA shaped in conformity with an outer circumferential shape of the cylindrical portion 33.

In the exemplary embodiment, the two cap bodies 51 and the uniting portion 52 of the cap member 5 are integrally formed from a rubber or a synthetic resin.

The cap bodies 51 each include: an outer wall 511 having an inner circumferential surface engageable with an outer circumferential surface of the step 32; an inner wall 512 having an outer circumferential surface engageable with an inner circumferential surface of the operation hole 32A; and a top plate 513 connected to a base edge of the outer wall 511 and a base edge of the inner wall 512.

The outer circumferential surface of the step 32 is provided with a plurality of circumferential lugs 320. The outer wall 511 has an inner circumferential surface in contact with edges of the lugs 320. When the edges of the lugs 320 are in contact with the inner circumferential surface of the outer wall 511, waterproofness is improved. It should be noted that the inner circumferential surface of the outer wall 511 may be provided with a circumferential groove 51A engageable with the lugs 320 in the exemplary embodiment (see imaginary lines in FIGS. 11 and 12).

The inner wall 512 is in pressure contact with the operation holes 32A over a predetermined length.

The top plate 513 is provided with identification signs 51S, 51Z for identifying the operable portions 72A. In the exemplary embodiment, the left one of the operation holes 32A in the figures is provided for operating the operable portion 72A of the electronic adjusting unit 72 for span adjustment, so that the a mark "S" is printed as the identification sign 51S. The right one of the operation holes 32A is provided for operating the operable portion 72A of the electronic adjusting unit 72 for zero adjustment, so that a mark "Z" is printed as the identification sign 51Z (see FIGS. 3, 4 and 10). It should be noted that the identification signs 51S, 51Z are different marks in the exemplary embodiment, but may alternatively be, for instance, different letters and/or have different colors.

The uniting portion 52 includes a uniting plate 521 coplanar and integral with the top plate 513 and a uniting wall 522 coplanar and integral with the outer wall 511.

The uniting plate 521 is connected to the first end of the linear loss-preventing member 53.

The linear loss-preventing member 53 is an elastic string body made of a synthetic resin and the second end of the linear loss-preventing member 53 is inserted into a hole portion 32B provided to the step 32 between the two operation holes 32A.

The hole portion 32B includes: a large-diameter part 32B1 provided to the cover body 30 and opened in the bottom surface 3A; a small-diameter part 32B2 provided to the step 32 and opened in a flat surface of the step 32; and a stepped portion 32B3 defined between the large-diameter part 32B1 and the small-diameter part 32B2. The linear loss-preventing member 53 is engageable with the stepped portion 32B3 of the hole portion 32B.

The linear loss-preventing member 53 has a length sufficient to avoid interference of the cap member 5 with a tool such as a driver inserted into one of the operation holes 32A when the cap member 5 is removed and a retaining portion 530 is engaged with the stepped portion 32B3 of the hole portion 32B. The retaining portion 530 is thus spaced from the hole portion 32B when the cap member 5 is attached on the step 32.

The retaining portion 530 includes a split portion 531 provided to the second end of the linear loss-preventing member 53 and an adhesive 532 provided to a gap between split ends of the split portion 531. The adhesive 532 may be an instant adhesive, a molding compound or the like.

The adhesive 532 serves to keep a dimension between the split ends of the split portion 531 wider than an inner diameter of the small-diameter part 32B2 (see FIGS. 11 and 12).

It should be noted that the shape of the split portion 531 may be changed as desired in the exemplary embodiment, and thus may be in a V-shape, U-shape or rectangular shape (in a cross section) as shown in FIGS. 11 and 12. Further, as shown in FIGS. 11 and 12, the second end of the linear loss-preventing member 53 may be split into two parts by providing one slit, into three parts by providing three slits, or into four parts by providing two intersecting slits.

Next, description will be made on a method of manufacturing the physical quantity measuring device according to the exemplary embodiment.

Detector Attaching Process

The detector 6 is, for instance, welded to the shaft 21 of the joint 2 and the first open end of the case 1 is, for instance, welded to the joint 2.

Cover Member Assembling Process

The cylindrical member 80 of the signal transmitting member 8 is mounted in the cylindrical portion 33 of the cover member 3, and the cap member 5 is attached to the cover member 3.

In order to attach the cap member 5 to the cover member 3, the linear loss-preventing member 53 is first inserted into the hole portion 32B until the second end of the linear loss-preventing member 53 is exposed from the bottom-side open end of the hole portion 32B of the cover member 3. The uniting portion 52 and the linear loss-preventing member 53 of the cap member 5 are integrally formed in advance. It should be noted that the uniting portion 52 and the first end of the linear loss-preventing member 53 of the cap member 5 may alternatively be connected to each other with an adhesive or the like in the exemplary embodiment.

The retaining portion 530 is then provided on the second end of the linear loss-preventing member 53.

In order to provide the retaining portion 530, after or before the linear loss-preventing member 53 is inserted into the hole portion 32B, a slit is provided to the second end of the linear loss-preventing member 53. The slit ends of the second end of the linear loss-preventing member 53 are then separated to form the split portion 531 and the adhesive 532 is applied to the split portion 531. When the adhesive 532 is cured, the split portion 531 is kept split. In this manner, the retaining portion 530 is provided on the second end of the linear loss-preventing member 53.

In the cover member assembling process, the cap bodies 51 of the cap member 5 are attached to the two operation holes 32A of the step 32. In the above state, the retaining portion 530 is spaced from the hole portion 32B (see FIG. 1).

Process for Attaching Circuit Board in Case

Next, the substrate body 70 including the electronic circuit unit 71 and the electronic adjusting units 72 is attached to the cover member 3. Specifically, the first substrate 701 and the second substrate 702 of the substrate body 70 are pushed into the cover body 30 along the support grooves 34A defined by the support projections 35 of the cover member 3. Before pushing the first substrate 701, the claws 36 opposed to each other are pushed away from each other. When the first substrate 701 is pushed deepest into the cover body 30, the claws 36 approach each other with the assistance of an elasticity of the supporting portions 31 to which the claws 36 are provided, so that the end of the first substrate 701 is held by the claws 36.

When the first substrate 701 is held by the claws 36, a gap is defined between the substrate body 70 and the bottom surface 3A of the cover body 30. The holder 9 is then inserted into the gap (see FIG. 7) until the first plate 91A is brought into contact with the side surfaces of the supporting portions 31 and the engagement pieces 92 are inserted into the engagement holes 702A to engage the second substrate 702. The engagement pieces 92 and the engagement holes 702A are then soldered to each other.

The circuit board 7 thus held relative to the cover member 3 is then disposed inside the case 1. In the exemplary embodiment, the cover member 3, the circuit board 7 and the holder 9 are shaped in conformity with one another to be a unit.

It should be noted that the detector 6 and the circuit board 7 as well as the circuit board 7 and the signal transmitting member 8 are connected through a wiring at an appropriate timing, for instance, prior to the detector attaching process.

Bonding Process

The cover body 30 of the cover member 3 is bonded to the second open end of the case 1. Specifically, the cover member 3 with the circuit board 7 supported thereon is fitted in the fitting ring 12 of the case 1. The holder 9 is thus held between the stepped portion 13 of the case 1 and the cover body 30, so that the circuit board 7 engaged with the holder 9 is immobilized in the case 1. Simultaneously, the holder 9 is electrically connected to the case 1.

Subsequently, an edge of the fitting ring 12 is crimped to fix the cover body 30 and the flat portion 91 of the holder 9 to each other.

Immediately after the thus-manufactured physical quantity measuring device is attached to the mount or after a predetermined operation of the thus-manufactured physical quantity measuring device is performed, the electronic adjusting unit(s) 72 may be adjusted.

In order to adjust the electronic adjusting unit(s) 72, the cap member 5 is held and pulled. The cap bodies 51 are thus removed from the operation holes 32A so that the operation holes 32A are uncovered. Even when the cap member 5 is pulled with a large force, the linear loss-preventing member 53 is prevented from being completely pulled out with the assistance of the retaining portion 530 provided on the second end of the linear loss-preventing member 53, the retaining portion 530 being engaged with the stepped portion 32B3 of the hole portion 32B of the cover body 30. It should be noted that the linear loss-preventing member 53 has the predetermined length, so that the electronic adjusting unit(s) 72 can be adjusted without interference of the cap bodies 51.

After the two operation holes 32A are uncovered, a tool such as a driver is inserted into one of the operation hole 32A corresponding to one of the electronic adjusting units 72 to be adjusted, and the operable portion 72A is operated with the tool.

The one of the electronic adjusting units 72 to be adjusted can be identified with reference to the identification signs 51S, 51Z printed on the cap bodies 51.

With the uniting portion 52 uniting one of the cap bodies 51 to the other cap body 51, both cap bodies 51 are not separated from each other irrespective of whether or not the cap bodies 51 are removed.

After the completion of adjustment of the electronic adjusting unit(s) 72, the uncovered operation holes 32A are covered by the cap bodies 51.

The exemplary embodiment as described above provides the following advantageous effects.

(1) The plate-shaped circuit board 7, which receives a detection signal from the detector 6, is housed in the case 1 and is held by the holder 9 with the flat substrate surface thereof intersecting with the bottom surface 3A of the cover member 3. The holder 9 is attached to the cover member 3. The cover member 3 includes the cover body 30, the elongated supporting portions 31 projecting from the bottom surface 3A of the cover body 30 into the case 1. The supporting portions 31 each include the pair of support projections 35 that longitudinally support one of the opposite lateral side surfaces 70A of the circuit board 7. The holder 9 includes the engagement pieces 92 engageable with the second substrate 702 of the circuit board 7. With the above arrangement, it is not necessary to bond the circuit board 7 to a member of the detector, so that an assembly process for the physical quantity measuring device can be simplified. Further, since each of the side surfaces 70A of the circuit board 7 is longitudinally supported by the support projection 35, the circuit board 7 can be accurately positioned to the bottom surface 3A. Further, since the holder 9 is attached to the cover member 3 and the circuit board 7 is engaged with the holder 9, the circuit board 7 is immobilized to the cover member 3 and thus reliably held relative to the cover member 3.

(2) The supporting portions 31 each include the claw 36 disposed between the support projections 35 to prevent detachment of the circuit board 7 from the bottom surface 3A. The holder 9 includes the flat portion 91 facing the bottom surface 3A of the cover member 3. With the above arrangement, the claw 36 serves to prevent the circuit board 7 from falling off the support projections 35, so that displacement of the circuit board 7 relative to the cover member 3 is restrained and thus the circuit board 7 is further reliably held relative to the cover member 3.

(3) A peripheral portion of the holder 9 is held between the cover body 30 and the case 1, thereby easily and reliably attaching the holder 9 to the cover member 3.

(4) The case 1 is crimped to fix the cover body 30 to the flat portion 91 of the holder 9, thereby stably supporting the circuit board 7 to the cover member 3 and, further, simplifying the assembly process of the device.

(5) The case 1 and the holder 9 are made of metal and the cover member 3 is made of a synthetic resin, so that the circuit board 7 can be easily grounded.

(6) The substrate body 70 includes the two first substrate 701 and second substrate 702 arranged in parallel, so that electronic components required for pressure detection can be arranged not only on the first substrate 701 but also on the second substrate 702. Therefore, as compared with the case where the electronic components are arranged in a single substrate, a length of the physical quantity measuring device defined in an axial direction of the case 1 can be reduced.

(7) The engagement pieces 92 each include the engagement claw 92B engageable with one of the engagement holes 702A of the second substrate 702. The second substrate 702 can thus be easily supported by the holder 9. Further, displacement of the circuit board 7 in an in-plane direction of the flat portion 91 of the holder 9 can be prevented.

(8) Since the engagement holes 702A are provided to the second substrate 702 at positions adjacent to the bottom surface 3A, the engagement pieces 92 can be shortened, which results in reduction in the possibility of breakage or the like of the engagement piece 92.

(9) The pair of support projections 35 have surfaces facing each other (i.e., the pair of first support surfaces 351), the first support surfaces 351 facing the peripheries of the flat surfaces of the first substrate 701 or the second substrate 702. The peripheries of the first support surfaces 351 are connected by a surface (i.e., the second support surface 342) that faces one of the side surfaces 70A of the first substrate 701 or the second substrate 702. The above two support surfaces including the first support surfaces 351 and the second support surface 342 define the U-shaped support groove 34A for supporting the first substrate 701 or the second substrate 702. With the U-shaped support groove 34A, the first substrate 701 or the second substrate 702 is reliably supported in three directions.

(10) The cover member 3, the circuit board 7 and the holder 9 are shaped in conformity with one another to be a unit, which results in a reduction in the number of components and thus in a reduction in production costs.

(11) The circuit board 7 including the electronic circuit unit 71 and the electronic adjusting units 72 is disposed in the case 1. The signal transmitting member 8 connected to the circuit board 7 is mounted in the mount hole 33A of the cover member 3. The cover member 3 is provided with the operation holes 32A corresponding to the plurality of operable portions 72A of the electronic adjusting units 72. The cap member 5 is attached to the cover member 3 to cover the operation holes 32A. The operation holes 32A for adjusting the electronic adjusting units 72 are easily covered/uncovered by the cap member 5 with the simple arrangement including the plurality of cap bodies 51 and the uniting portion 52 uniting the cap bodies 51. The operation holes 32A are independent of the mount hole 33A where the signal transmitting member 8 is mounted, so that the electronic adjusting units 72 can be adjusted irrespective of whether or not the signal transmitting member 8 mounted in the mount hole 33A is connected to any other connection member.

(12) The linear loss-preventing member 53 with elasticity has the first end, for instance, integral with or connected to the uniting portion 52 and the second end engageable with the stepped portion 32B3 of the hole portion 32B of the cover member 3. With the above arrangement, the cap member 5 is undetachable from the cover member 3, so that the operation holes 32A can be prevented from being inadvertently left uncovered by the cap member 5. Further, the linear loss-preventing member 53 exhibits elasticity and the cap member 5 can be laid at a position remote from the operation holes 32A during adjustment of the electronic adjusting unit(s) 72, thereby facilitating the adjustment of the electronic adjusting unit(s) 72.

(13) The step 32 projecting from the cover body 30 is provided with the operation holes 32A. Further, the cap bodies 51 have the inner walls 512 engageable with the inner circumferential surfaces of the operation holes 32A and the outer walls 511 having the inner circumferential surfaces engageable with an outer circumferential surface of the step 32. With the above arrangement, water is reliably prevented from entering the case 1 through the operation holes 32A.

(14) The linear loss-preventing member 53, which is inserted into the hole portion 32B provided to the step 32 at a position between the operation holes 32A arranged side by side, has the first end, for instance, integral with or connected to the uniting plate 521 disposed at the center of the cap member 5. A space between the operation holes 32A can thus be efficiently used as a space for inserting the linear loss-preventing member 53. Consequently, the device size can be reduced.

(15) The linear loss-preventing member 53 has the second end provided with the retaining portion 530, so that the cap bodies 51 are reliably prevented from coming out of the cover member 3.

(16) The retaining portion 530 includes the split portion 531 formed by splitting the second end of the linear loss-preventing member 53 and the adhesive 532 provided to a gap between split ends of the split portion 531. The retaining portion 530 can thus be easily provided.

(17) The cylindrical portion 33 in which the signal transmitting member 8 is mounted is disposed adjacent to the step 32, and the cap member 5 is provided with the recess SA shaped in conformity with the outer circumferential shape of the cylindrical portion 33. With the above arrangement, as long as the recess SA is positioned in conformity with the outer circumferential shape of the cylindrical portion 33, the cap member 5 can be attached to the operation holes 32A without being laterally inverted.

(18) The top plate 513 of the cap member 5 is provided with the identification signs 51S, 51Z for identifying the operable portions 72A, so that when the cap member 5 is removed to operate one of the operable portions 72A, wrong one of the operable portions 72A can be kept from being operated.

(19) Prior to attaching the cap member 5 to the cover member 3, the linear loss-preventing member 53 is inserted until the second end of the linear loss-preventing member 53 is exposed from the bottom-side open end of the hole portion 32B, and then the retaining portion 530 is provided on the second end of the linear loss-preventing member 53. The physical quantity measuring device can thus be efficiently manufactured.

Incidentally, it should be understood that the scope of the invention is not limited to the above exemplary embodiment, but includes modifications and improvements compatible with the invention.

For instance, in the above exemplary embodiment, the substrate body 70 includes the first substrate 701 and the second substrate 702, but may alternatively include three substrates or a single substrate as shown in FIGS. 13 to 15.

As shown in FIGS. 13 to 15, two support projections 35 are provided along the longitudinal direction of the base 34 to support the single substrate body 70.

According to the invention, the engagement holes 702A may be provided to the second substrate 702 at the farthest positions from the bottom surface 3A (near the lower edge of the substrate body 70). In this case, the rising pieces 92A of the engagement pieces 92 are replaced by elongated rising pieces.

The elongated rising pieces may have inner surfaces that face each other at a predetermined distance equal to the width of the substrate body 70 and are each provided with a guide groove for guiding the side surface 70A of the substrate body 70 without departing from the scope of the invention. In this case, the pair of support projections 35 may be shortened in a direction perpendicular to a mutually facing direction (i.e., shortened along a thickness direction of the substrate body 70) so that the support projections 35 face a rear surface of the substrate body 70 and support the periphery of the substrate body 70 in combination with the elongated rising pieces. Ends of the support projections 35 may each be provided with a claw for supporting the lower edge of the substrate body 70.

In the exemplary embodiment, the case 1 is crimped to directly attach the holder 9 to the cover body 30, but the holder 9 may be indirectly attached to the cover member 3 with an intervening member such as an adhesive between the cover body 30 and the holder 9 according to the invention. According to the invention, an arrangement different from the above may be employed to directly attach the holder 9 to the cover body 30. For instance, the holder 9 may be fastened to the cover member 30 fitted on the case 1, or may be fastened to the cover body 30 with a fastener such as a bolt.

Further, the above arrangement of the cap member 5 described in the exemplary embodiment is not requisite for the invention. For instance, two cap members with the same shape may be independently attached to the operation holes 32A without being connected using a string.

The operation holes 32A for operating the operable portions 72A are provided to the cover member 30, but the operation holes may be provided to a circumferential surface of the case 1 according to the invention.

Further, according to the invention, the supporting portions 31 may include no claw 36 and the holder 9 may include no flat portion 91.

In the above exemplary embodiment, the description is made on the physical quantity measuring device configured to measure a pressure, but the invention is applicable to, for instance, a differential pressure sensor and a temperature sensor in addition to the physical quantity measuring device.

What is claimed is:

1. A physical quantity measuring device comprising:
    a cylindrical case having a first open end and a second open end;
    a cover member attached to the first open end of the case, the cover member having a bottom surface;
    a detector provided to the second open end of the case to detect a physical quantity;
    a joint provided with the detector and attached near the second open end of the case;
    a plate-shaped circuit board configured to receive a detection signal from the detector; and
    a holder attached to the cover member to hold the circuit board in a manner that a flat surface of the circuit board intersects with the bottom surface, the holder comprising an engagement piece engageable with the circuit board, the cover member comprising:
    a cover body defining the bottom surface; and
    a supporting portion projecting from the bottom surface toward the joint, the supporting portion comprising a pair of support projections configured to support opposite side surfaces of the circuit board along a projecting direction of the supporting portion.

2. The physical quantity measuring device according to claim 1, wherein
    the supporting portion further comprises a claw provided to each of the support projections to prevent the circuit board from being detached from the bottom surface, and the holder further comprises a flat portion facing the bottom surface, the flat portion being provided with the engagement piece.

3. The physical quantity measuring device according to claim 1, wherein the holder is held between the cover body and the case.

4. The physical quantity measuring device according to claim 3, wherein the case is crimped to fasten the cover body and the holder to each other.

5. The physical quantity measuring device according to claim 4, wherein the case and the holder are each made of a metal and the cover member is a made of a synthetic resin.

6. The physical quantity measuring device according to claim 1, wherein the engagement piece comprises an engagement claw engageable with an engagement hole provided to the flat surface of the circuit board.

7. The physical quantity measuring device according to claim 6, wherein the engagement hole is provided adjacent to the bottom surface of the circuit board.

8. The physical quantity measuring device according to claim 1, wherein the flat surface of the circuit board comprises two flat surfaces intersecting with the side surfaces of the circuit board, the pair of support projections have mutually opposed surfaces functioning as a pair of first support surfaces facing peripheries of the flat surfaces of the circuit board, the pair of first support surfaces have edges connected by a second support surface facing one of the side surfaces of the circuit board, and the pair of first support surfaces and the second support surface define a support groove for supporting the circuit board.

* * * * *